US012264799B2

(12) United States Patent
Aoyama et al.

(10) Patent No.: US 12,264,799 B2
(45) Date of Patent: Apr. 1, 2025

(54) DISPLAY DEVICE

(71) Applicant: TOYODA GOSEI CO., LTD., Kiyosu (JP)

(72) Inventors: Shunsuke Aoyama, Kiyosu (JP); Koji Okumura, Kiyosu (JP); Koji Fukagawa, Kiyosu (JP); Hiroaki Ando, Kiyosu (JP); Takeshi Yagami, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/758,468

(22) Filed: Jun. 28, 2024

(65) Prior Publication Data

US 2025/0027628 A1 Jan. 23, 2025

(30) Foreign Application Priority Data

Jul. 21, 2023 (JP) ................................ 2023-119178

(51) Int. Cl.

| | |
|---|---|
| ***F21S 41/40*** | (2018.01) |
| ***F21S 41/13*** | (2018.01) |
| *F21W 104/00* | (2018.01) |
| *F21Y 113/00* | (2016.01) |

(52) U.S. Cl.

CPC ............... *F21S 41/40* (2018.01); *F21S 41/13* (2018.01); *F21W 2104/00* (2018.01); *F21Y 2113/30* (2023.05)

(58) Field of Classification Search

CPC ....... F21S 41/40; F21S 41/13; F21W 2104/00

See application file for complete search history.

(56) References Cited

U.S. PATENT DOCUMENTS

| | | | | |
|---|---|---|---|---|
| 2018/0106442 A1* | 4/2018 | Gardiner | ................ | G02B 5/045 |
| 2022/0298621 A1* | 9/2022 | Hirano | ..................... | G02B 1/11 |
| 2022/0308206 A1* | 9/2022 | Hirano | .................... | G01S 7/027 |
| 2023/0304642 A1* | 9/2023 | Sato | ...................... | F21S 43/145 |

FOREIGN PATENT DOCUMENTS

| | | |
|---|---|---|
| JP | 2021-160219 A | 10/2021 |
| JP | 2022-007921 A | 1/2022 |
| JP | 2022-035593 A | 3/2022 |

OTHER PUBLICATIONS

U.S. Appl. No. 18/758,028, filed Jun. 28, 2024, Aoyama et al.

* cited by examiner

*Primary Examiner* — Tracie Y Green
*Assistant Examiner* — Michael Chiang
(74) *Attorney, Agent, or Firm* — Posz Law Group, PLC

(57) ABSTRACT

A display device includes a light-transmitting portion, a display light source arranged at an inner side of the light-transmitting portion, and a housing including an opening. The housing accommodates the display light source and the light-transmitting portion is arranged in the opening. The light-transmitting portion includes a transparent plastic base member, a first color exhibiting layer containing dye or pigment, and a second color exhibiting layer containing a filler made of a cold mirror thin film. The first color exhibiting layer has a transmittance of 20% or more for light having a specific wavelength. The second color exhibiting layer has a reflectance of 80% or less for light having a wavelength not absorbed by the dye or the pigment of the first color exhibiting layer and a transmittance of 60% or more for light having a wavelength absorbed by the dye or the pigment of the first color exhibiting layer.

3 Claims, 2 Drawing Sheets

DISPLAY DEVICE

CROSS-REFERENCE TO RELATED APPLICATIONS

This application is based upon and claims the benefit of priority from prior Japanese Patent Application No. 2023-119178, filed on Jul. 21, 2023, the entire contents of which are incorporated herein by reference.

BACKGROUND

1. Field

The present disclosure relates to a display device installed in, for example, a vehicle.

2. Description of Related Art

Japanese Laid-Open Patent Publication No. 2022-35593 discloses a light-emitting grille as a type of display device installed in, for example, a vehicle. Such a light-emitting grille includes a light-transmitting outer cover and a light-emitting element arranged at the inner side of the outer cover. The light-emitting grille emits light by allowing light from the light-emitting element to pass through the outer cover at night.

The light-emitting grille is not usually caused to emit light during the daytime. When external light such as sunlight strikes the light-emitting grille while the light-emitting element does not emit light, part of the striking light passes through the outer cover and the rest is reflected by the outer cover. In some cases, the vehicle includes a hood arranged adjacent to the light-emitting grille. When external light strikes the hood, the hood reflects most of the striking light. This will result in a significant difference between the appearance of the light-emitting grille and the appearance of the hood and may adversely affect the appearance of the vehicle in which the light-emitting grille is arranged.

Such an issue is not limited to the display device arranged in a vehicle, and is generally common to, for example, display devices arranged in movable bodies other than vehicles, exterior walls of a building, or the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a display device includes a light-transmitting portion arranged on an electromagnetic-wave-transmissive panel, a display light source arranged at an inner side of the light-transmitting portion and configured to emit light to the light-transmitting portion to illuminate and display the light-transmitting portion, and a housing including an opening. The housing accommodates the display light source. And the light-transmitting portion is arranged in the opening. The light-transmitting portion includes a transparent plastic base member, a first color exhibiting layer containing dye or pigment, and a second color exhibiting layer containing a filler made of a cold mirror thin film reflecting visible light and transmitting infrared light. The first color exhibiting layer has a transmittance of 20% or more for light having a specific wavelength. The second color exhibiting layer has a reflectance of 80% or less for light having a wavelength not absorbed by the dye or the pigment of the first color exhibiting layer and a transmittance of 60% or more for light having a wavelength absorbed by the dye or the pigment of the first color exhibiting layer.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A display device configured as a display device arranged in a vehicle according to one embodiment will now be described with reference to the drawings.

Components of Vehicle 11

Figure 1:
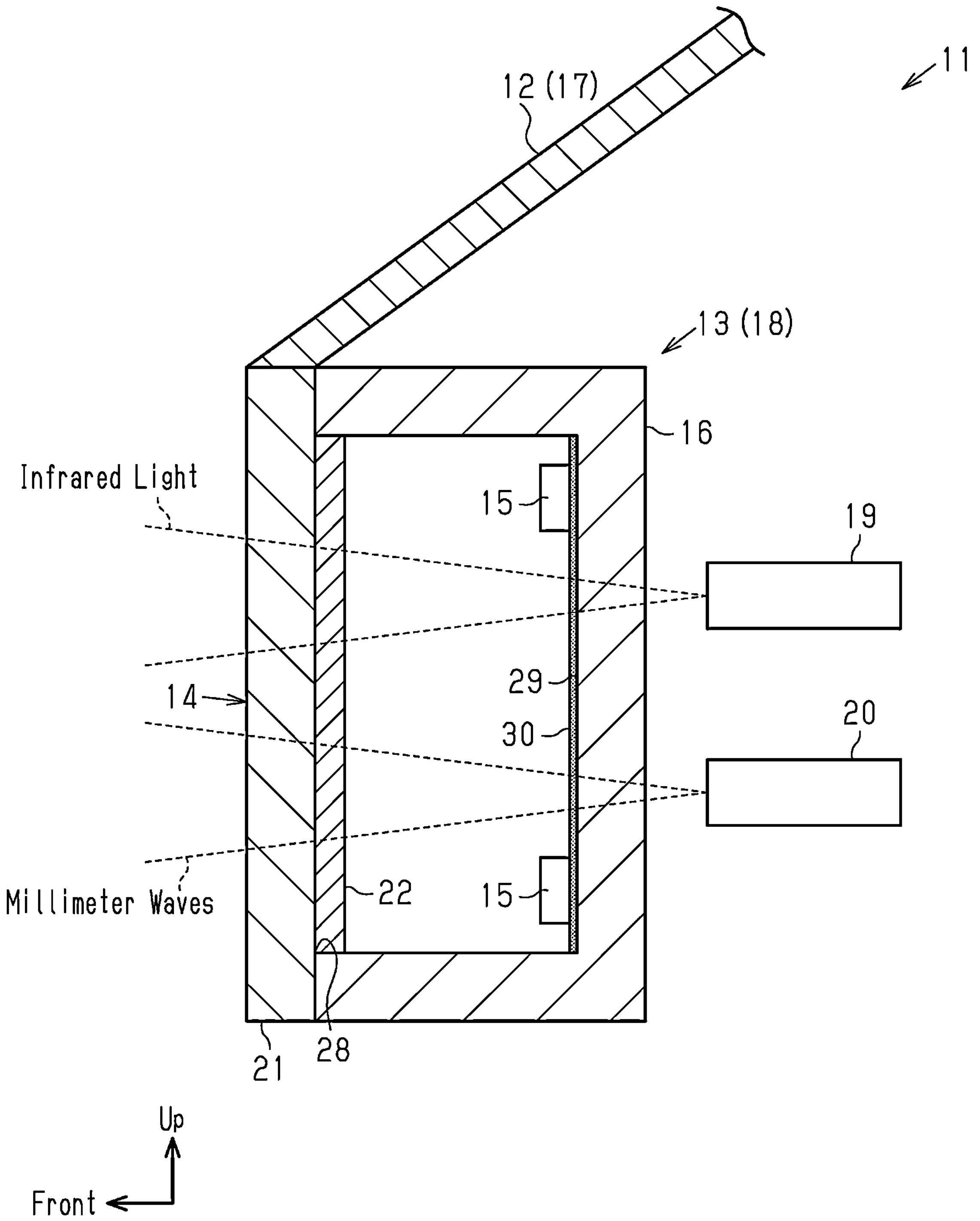
FIG. 1 is a schematic cross-sectional view showing a vehicle exterior structure according to one embodiment.

As shown in FIG. 1, a vehicle 11 includes a non-light-transmitting panel 12 and a display device 13. The vehicle 11 is an example of a subject in which the display device 13 is arranged. The non-light-transmitting panel 12 is an example of a non-light-transmitting portion. The display device 13 includes a light-transmitting panel 14 arranged on an electromagnetic-wave-transmissive panel, display light sources 15, and a housing 16. The light-transmitting panel 14 is an example of a light-transmitting portion. The non-light-transmitting panel 12 forms, for example, a hood 17 arranged in the front of the vehicle 11. The display device 13 forms, for example, a light-emitting grille 18. The light-transmitting panel 14 forms, for example, an exterior of the light-emitting grille 18 arranged in the front of the vehicle 11.

In the following description, the left side in FIG. 1 is defined as the front side, and the right side in FIG. 1 is defined as the rear side. In addition, directions represented by terms such as front, rear, up, down, left, and right are defined with reference to a vehicle.

The light-transmitting panel 14 is arranged near the non-light-transmitting panel 12. In one example, the light-transmitting panel 14 is arranged adjacent to the lower side of the non-light-transmitting panel 12. The exterior color of the non-light-transmitting panel 12 and the exterior color of the light-transmitting panel 14 are similar to each other. An infrared sensor 19 and a millimeter wave sensor 20 are arranged next to each other in the vertical direction at the rear side of the display device 13 in the vehicle 11.

The infrared sensor 19 transmits infrared light (near-infrared light) forward from the vehicle 11 and receives infrared light striking and reflected by an object outside the vehicle including a preceding vehicle, a pedestrian, and the like. The infrared light transmitted by the infrared sensor 19 has a wavelength of, for example, 900 nm. The infrared sensor 19 recognizes the object and detects the distance between the vehicle 11 and the object, the relative speed between the vehicle 11 and the object, and the like based on the transmitted and received infrared light. The infrared sensor 19 can detect an object smaller than an object that can be detected by the millimeter wave sensor 20.

The millimeter wave sensor 20 transmits millimeter waves forward from the vehicle 11 and receives millimeter waves striking and reflected by an object outside the vehicle including a preceding vehicle, a pedestrian, and the like. The millimeter wave sensor 20 recognizes the object and detects the distance between the vehicle 11 and the object, the relative speed between the vehicle 11 and the object, and the like based on the transmitted and received millimeter waves. Millimeter waves are electromagnetic waves with wavelengths in a range of 1 mm to 10 mm and frequencies in a range of 30 GHz to 300 GHz. The millimeter wave sensor 20 is resistant to bad weather such as rain, fog, and snow, and has a longer detectable distance than the infrared sensor 19.

Non-Light-Transmitting Panel 12

As shown in FIG. 1, the non-light-transmitting panel 12 does not transmit external light such as sunlight. In other words, when receiving the external light, the non-light-transmitting panel 12 reflects substantially 100% of the light that has wavelengths not absorbed by the non-light-transmitting panel 12.

Light-Transmitting Panel 14

Figure 2:
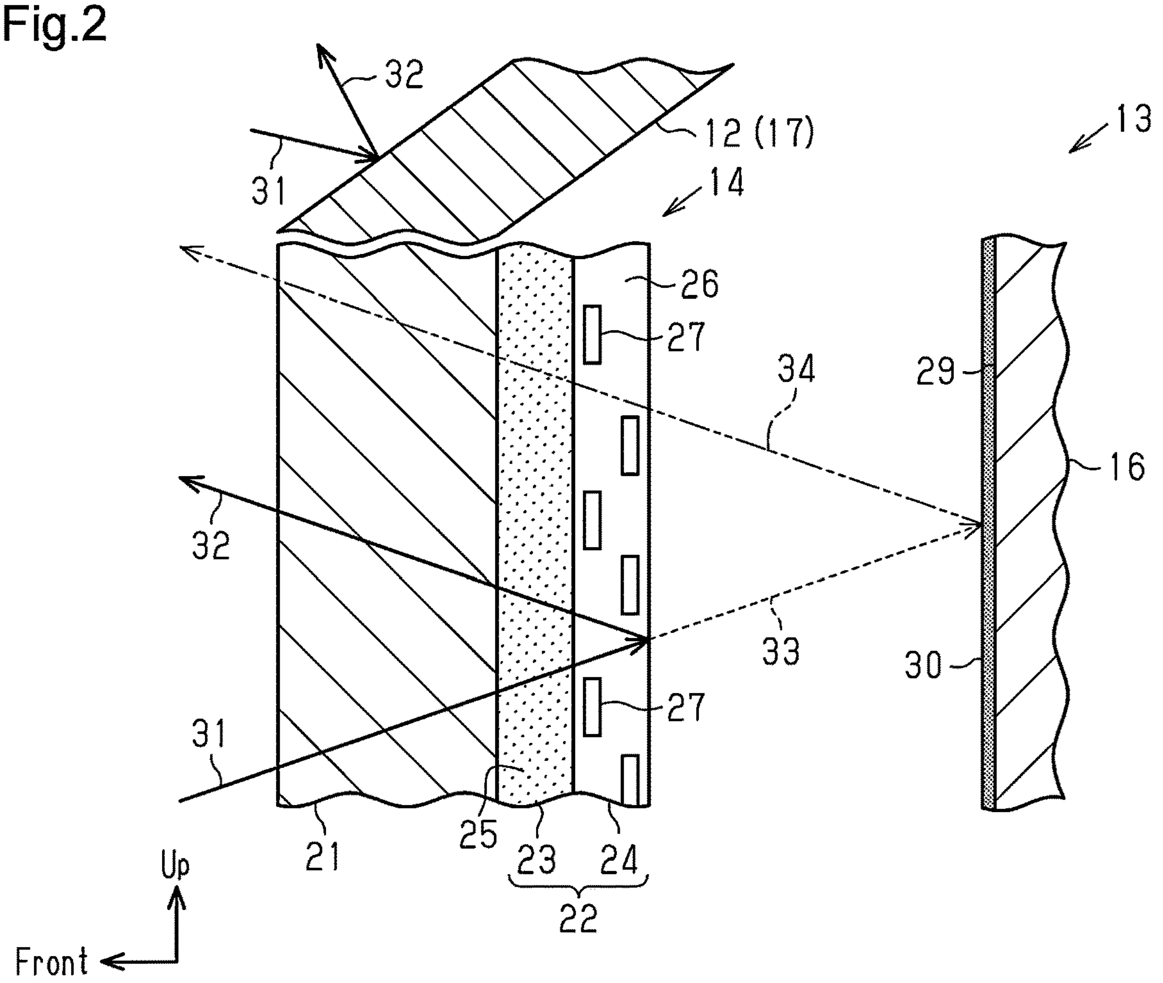
FIG. 2 is a partially enlarged view of the vehicle exterior structure shown in FIG. 1.

As shown in FIGS. 1 and 2, the light-transmitting panel 14 reflects and transmits external light such as sunlight. In other words, when receiving the external light, the light-transmitting panel 14 reflects part of the light that has wavelengths not absorbed by the light-transmitting panel 14, and transmits the remaining light. For example, when receiving the external light, the light-transmitting panel 14 reflects 80% of the light that has wavelengths not absorbed by the light-transmitting panel 14 and transmits the remaining 20%. The light-transmitting panel 14 is electromagnetic-wave-transmissive. In other words, the light-transmitting panel 14 is infrared-transmissive and millimeter-wave-transmissive. As described above, the exterior color of the non-light-transmitting panel 12 and the exterior color of the light-transmitting panel 14 are similar to each other. Thus, the wavelengths of light that is not absorbed by the non-light-transmitting panel 12 are substantially the same as the wavelengths of light that is not absorbed by the light-transmitting panel 14.

The light-transmitting panel 14 includes a plate-shaped transparent plastic base member 21 and an ornamental layer 22 arranged on the rear surface of the transparent plastic base member 21. The ornamental layer 22 includes a first color exhibiting layer 23 arranged on the rear surface of the transparent plastic base member 21 and a second color exhibiting layer 24 arranged on the rear surface of the first color exhibiting layer 23. The transparent plastic base member 21 is made of, for example, a polycarbonate (PC) plastic. The first color exhibiting layer 23 is a layer in which a first base plastic 25 contains dye or pigment.

The first color exhibiting layer 23 preferably has a transmittance of 20% or more for light having a specific wavelength. The light having the specific wavelength is, for example, light having the same wavelength as the exterior color of the non-light-transmitting panel 12. In the case in which the first color exhibiting layer 23 has a transmittance of less than 20% for the light having the specific wavelength, the first color exhibiting layer 23 may have insufficient components of the exterior color of the non-light-transmitting panel 12 when the display light sources 15 illuminate and display the light-transmitting panel 14. The first color exhibiting layer 23 preferably has a transmittance of 20% for light having wavelengths absorbed by the dye or the pigment of the first color exhibiting layer 23. Further, the first color exhibiting layer 23 preferably has a transmittance of 100% for light having wavelengths not absorbed by the dye or the pigment of the first color exhibiting layer 23. The wavelengths absorbed by the dye or the pigment of the first color exhibiting layer 23 may be referred to as a first absorption wavelength, and the wavelengths not absorbed by the dye or the pigment of the first color exhibiting layer 23 may be referred to as a first non-absorption wavelength.

Figure 3:
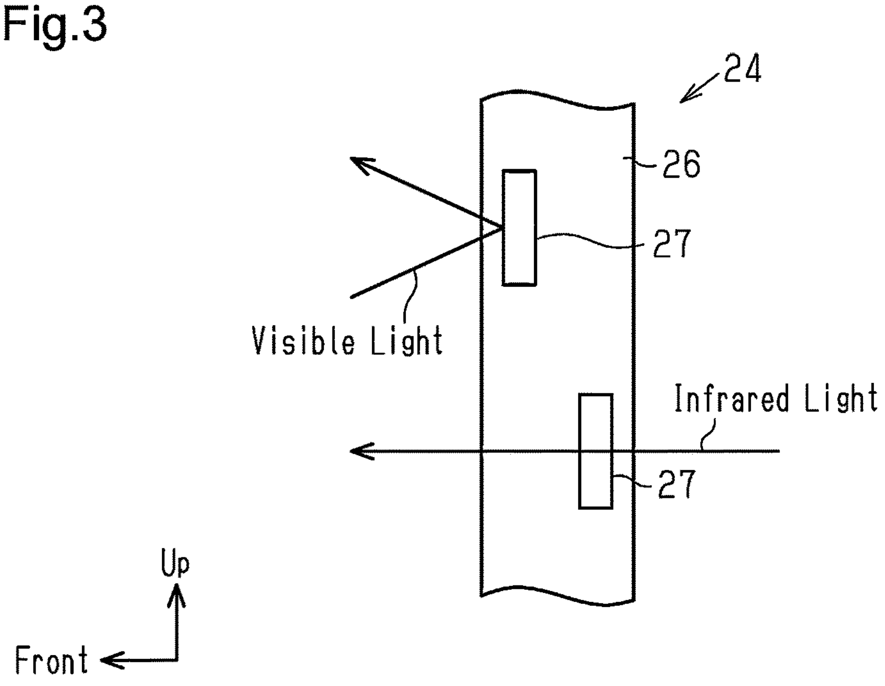
FIG. 3 is a partially enlarged view of a second color exhibiting layer included in the vehicle exterior structure shown in FIG. 1.

As shown in FIGS. 2 and 3, the second color exhibiting layer 24 is a layer in which a second base plastic 26 contains fillers 27 made of a cold mirror thin film. The cold mirror thin film reflects visible light and transmits infrared light. The second color exhibiting layer 24 preferably has a reflectance of 80% or less for light having the first non-absorption wavelength. When the second color exhibiting layer 24 has a reflectance of 100% for the light having the first non-absorption wavelength, part of light emitted from the display light sources 15 that has the first non-absorption wavelength is not transmitted at all.

The second color exhibiting layer 24 preferably has a transmittance of 60% or more for light having the first absorption wavelength. When the second color exhibiting layer 24 has a transmittance of less than 60% for the light having the first absorption wavelength, there may be an insufficient amount of light having the first absorption wavelength that is reflected inside the housing 16 and then passes through the light-transmitting panel 14 to exit outward.

As shown in FIGS. 1 and 2, the light-transmitting panel 14 preferably has a transmittance of 60% or more for infrared light having a wavelength of, for example, 900 nm. When the light-transmitting panel 14 has a transmittance of less than 60% for infrared light, the detection accuracy of the infrared sensor 19 may be insufficient. The light-transmitting panel 14 preferably has an attenuation factor of 3.0 dB or less for millimeter waves during bidirectional travel. When the light-transmitting panel 14 has an attenuation factor exceeding 3.0 dB for millimeter waves during bidirectional travel, the detection accuracy of the millimeter wave sensor 20 may be insufficient.

Housing 16

As shown in FIG. 1, the housing 16 is rectangular and box-shaped including an opening 28 arranged at the front end. The opening 28 of the housing 16 is closed by the transparent plastic base member 21 of the light-transmitting panel 14. The housing 16 includes an opposed surface 29 opposed to the light-transmitting panel 14. The ornamental layer 22 of the light-transmitting panel 14 is arranged inside the housing 16.

The housing 16 is made of, for example, a polycarbonate (PC) plastic, an acrylonitrile-butadiene-styrene (ABS) copolymer plastic, an acrylonitrile-ethylene-propylene-diene styrene (AES) plastic, an acrylonitrile-styrene-acrylate (ASA) copolymer plastic, or the like.

The display light sources 15 are arranged at the upper end and the lower end of the opposed surface 29 opposed to the light-transmitting panel 14 in the housing 16. In other words, the housing 16 accommodates the two display light sources 15. Thus, each display light source 15 is arranged at the rear side (inner side) of the light-transmitting panel 14. The opposed surface 29 includes a reflecting portion 30 facilitating reflection of light. That is, the opposed surface 29 is covered by the reflecting portion 30. The reflecting portion 30 is formed of, for example, a white reflector or a reflecting mirror.

The display light source 15 includes a light-emitting diode (LED) that emits visible light and a control circuit that controls the LED. The display light source 15 emits visible light to the light-transmitting panel 14, and the visible light passing through the light-transmitting panel 14 illuminates and displays a character, a pattern, or the like.

Operation of Embodiment

The vehicle 11 normally causes the display light sources 15 to emit light while traveling at night. Then, the light from the display light sources 15 strikes the light-transmitting panel 14, and the light passing through the light-transmitting panel 14 illuminates and displays a character, a pattern, or the like. In this case, since the first color exhibiting layer 23 has a transmittance of 20% or more for light having the specific wavelength, the light displaying the character or the pattern includes the light having the specific wavelength.

Further, when the second color exhibiting layer 24 has a reflectance of, for example, 80% for light having the first non-absorption wavelength, the second color exhibiting layer 24 somewhat permits the transmission of part of light emitted from the display light sources 15 that has the first non-absorption wavelength. The light displaying the character or the pattern includes the light having the first non-absorption wavelength. Thus, the light passing through the light-transmitting panel 14 illuminates and displays the character, the pattern, or the like in a preferred manner.

In contrast, the vehicle 11 does not cause the display light sources 15 to emit light while traveling during the daytime because the vehicle 11 does not normally illuminate or display the character, the pattern, or the like in the light-transmitting panel 14. The light-transmitting panel 14 reflects part of light in an incoming external light, such as sunlight, having wavelengths not absorbed by the light-transmitting panel 14, and transmits the remaining light. In this case, when receiving the incoming sunlight, the non-light-transmitting panel 12 adjacent to the light-transmitting panel 14 reflects substantially all of the light that has wavelengths not absorbed by the non-light-transmitting panel 12. Thus, the reflectance of the sunlight in the light-transmitting panel 14 is less than the reflectance of the sunlight in the non-light-transmitting panel 12.

The amount of sunlight reflected by the light-transmitting panel 14 is less than the amount of sunlight reflected by the non-light-transmitting panel 12. In other words, there is a difference between the amount of sunlight reflected by the light-transmitting panel 14 and the amount of sunlight reflected by the non-light-transmitting panel 12. When this difference increases, even if the exterior color of the light-transmitting panel 14 and the exterior color of the non-light-transmitting panel 12 are similar to each other, color appearance will be significantly different between the light-transmitting panel 14 and the non-light-transmitting panel 12. As a result, the boundary between the light-transmitting panel 14 and the non-light-transmitting panel 12 is noticeable, adversely affecting the appearance of the vehicle 11.

In this respect, as shown in FIG. 2, in the present embodiment, light is released outward from the light-transmitting panel 14 as follows even when the display light sources 15 do not emit light while the vehicle 11 is traveling during the daytime. Specifically, when sunlight strikes the light-transmitting panel 14 as external light, the sunlight passes through the transparent plastic base member 21 and the first color exhibiting layer 23 and reaches the second color exhibiting layer 24. In this case, 100% of the sunlight passes through the transparent plastic base member 21. Then, in the sunlight passing through the transparent plastic base member 21, 20% of light having the first absorption wavelength passes through the first color exhibiting layer 23, and 100% of light having the first non-absorption wavelength passes through the first color exhibiting layer 23.

For example, when 80% of light having the first non-absorption wavelength in the sunlight reaching the second color exhibiting layer 24 is reflected by the second color exhibiting layer 24, 20% of the light passes through the second color exhibiting layer 24. Further, 60% or more of light having the first absorption wavelength in the sunlight reaching the second color exhibiting layer 24 passes through the second color exhibiting layer 24. The sunlight passing through the second color exhibiting layer 24 is reflected by the reflecting portion 30, and then part of the reflected light passes through the light-transmitting panel 14 to exit outward as described above. This increases the amount of light released outward from the light-transmitting panel 14.

Thus, the light-transmitting panel 14 exhibits color in a state in which the exterior color of the light-transmitting panel 14 is similar to the exterior color of the non-light-transmitting panel 12. This is because the exterior color of the non-light-transmitting panel 12 and the exterior color of the light-transmitting panel 14 have a more similar appearance as the difference between the amount of light released outward from the light-transmitting panel 14 and the amount of light released outward from the non-light-transmitting panel 12 decreases. As a result, the appearance of the light-transmitting panel 14 is similar to the appearance of the non-light-transmitting panel 12, and thus the boundary between the light-transmitting panel 14 and the non-light-transmitting panel 12 is less noticeable. This improves the appearance of the vehicle 11.

In one example, as indicated by arrows in FIG. 2, from the amount of incident sunlight 31 entering the light-transmitting panel 14 and the non-light-transmitting panel 12, the total amount of light that has wavelengths not absorbed by the light-transmitting panel 14 and the non-light-transmitting panel 12 is each referred to as "100." In this case, the light-transmitting panel 14 reflects "80" of the incident sunlight 31 as reflected light 32 and transmits "20" of the remaining incident sunlight 31 as transmitted light 33. The non-light-transmitting panel 12 reflects "100" of the incident sunlight 31 as reflected light 32. In this state, the amount of light released outward from the light-transmitting panel 14 is "80," and the amount of light released outward from the non-light-transmitting panel 12 is "100."

However, "20" of the transmitted light 33 passing through the light-transmitting panel 14 is reflected by the reflecting portion 30 of the housing 16, and then part (referred to as "A") of "20" passes through the light-transmitting panel 14 as inner reflected light 34 from the inner side of the light-transmitting panel 14 and is released outward. The amount of light released outward from the light-transmitting panel 14 is "80+A." Thus, the difference between the amount of light released outward from the light-transmitting panel 14 and the amount of light released outward from the non-light-transmitting panel 12 is reduced by the amount of "A." Thus, the exterior color of the light-transmitting panel 14 is similar to the exterior color of the non-light-transmitting panel 12. This improves the appearance of the vehicle 11 as the boundary between the light-transmitting panel 14 and the non-light-transmitting panel 12 is less noticeable.

In addition, since the light-transmitting panel 14 has a transmittance of 60% or more for infrared light having a wavelength of 900 nm, the detection accuracy of the infrared sensor 19 is ensured. Furthermore, since the light-transmitting panel 14 has an attenuation factor of 3.0 dB or less for millimeter waves during bidirectional travel, the detection accuracy of the millimeter wave sensor 20 is ensured. Thus, the light-transmitting panel 14 also serves as an electromagnetic wave-transmitting cover.

Advantages of Embodiment

The above-described embodiment achieves the following advantages.

(1) The display device 13 includes the light-transmitting panel 14, which is electromagnetic-wave-transmissive, the display light sources 15 arranged at the inner side of the light-transmitting panel 14, and the housing 16 with the opening 28. The light-transmitting panel 14 includes the transparent plastic base member 21, the first color exhibiting layer 23 containing dye or pigment, and the second color exhibiting layer 24 containing the fillers 27 made of a cold mirror thin film reflecting visible light and transmitting infrared light. The display light sources 15 emit light to light-transmitting panel 14 to illuminate and display the light-transmitting panel 14. The housing 16 accommodates the display light sources 15, and the light-transmitting panel 14 is arranged in the opening 28. The first color exhibiting layer 23 has a transmittance of 20% or more for light having a specific wavelength. The second color exhibiting layer 24 has a reflectance of 80% or less for light having wavelengths (first non-absorption wavelength) not absorbed by the dye or the pigment of the first color exhibiting layer 23. The second color exhibiting layer 24 also has a transmittance of 60% or more for light having wavelengths (first absorption wavelength) absorbed by the dye or the pigment of the first color exhibiting layer 23.

With the above structure, at night, the display light sources 15 emit light to the light-transmitting panel 14, and the light passes through the light-transmitting panel 14 toward the outside, thereby illuminating and displaying the light-transmitting panel 14. In contrast, in the daytime, the first color exhibiting layer 23 and the second color exhibiting layer 24 adequately transmit external light without requiring light from the display light sources 15. The transmitted light is reflected by the housing 16 and exits outward from the light-transmitting panel 14. This increases the amount of light exiting outward from the light-transmitting panel 14. Thus, the amount of light exiting outward from the light-transmitting panel 14 can be adjusted to approximate the amount of light released outward from the non-light-transmitting panel 12 arranged adjacent to the light-transmitting panel 14. As a result, the exterior color of the light-transmitting panel 14 can be similar to the exterior color of the non-light-transmitting panel 12, and thus the boundary between the light-transmitting panel 14 and the non-light-transmitting panel 12 is less noticeable. This improves the appearance of the vehicle 11 in which the display device 13 is arranged.

(2) In the display device 13, the opposed surface 29 of the housing 16, opposed to the light-transmitting panel 14, includes the reflecting portion 30 facilitating reflection of light.

With the above structure, the reflecting portion 30 efficiently reflects, toward the light-transmitting panel 14, light from the outside that passes through the first color exhibiting layer 23 and the second color exhibiting layer 24 and enters the housing 16. This further increases the amount of light passing through the light-transmitting panel 14 from the inner side of the housing 16 and exiting outward.

(3) In the display device 13, the light-transmitting panel 14 has a transmittance of 60% or more for infrared light and an attenuation factor of 3.0 dB or less for millimeter waves.

With the above structure, when an electromagnetic wave sensor such as the infrared sensor 19 or the millimeter wave sensor 20 is arranged at the inner side of the light-transmitting panel 14, the light-transmitting panel 14 can serve as an electromagnetic wave-transmitting cover that covers the infrared sensor 19, the millimeter wave sensor 20, or the like.

Modifications

The above-described embodiment may be modified as follows. The above-described embodiment and the following modifications can be combined as long as the combined modifications remain technically consistent with each other.

The reflecting portion 30 may be omitted.

In the light-transmitting panel 14, the ornamental layer 22 may be arranged on the front surface of the transparent plastic base member 21.

The light-transmitting panel 14 does not need to have a transmittance of 60% or more for infrared light.

The light-transmitting panel 14 does not need to have an attenuation factor of 3.0 dB or less for millimeter waves.

External light does not need to be sunlight and may be light from, for example, lighting equipment installed outdoors or indoors.

The ornamental layer 22 may include at least one of a tinted layer that adjusts reflected light and a complementary color layer that adjusts exhibited color.

In the display device 13, the light-transmitting portion and the non-light-transmitting portion may be arranged adjacent to each other on a panel that forms an ornamental surface.

The display device 13 may be arranged on a subject besides the vehicle 11. Examples of the subject include a catering robot, a drone, and an exterior wall or an interior wall of a building.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A display device, comprising:

a light-transmitting portion arranged on an electromagnetic-wave-transmissive panel;

a display light source arranged at an inner side of the light-transmitting portion, the display light source being configured to emit light to the light-transmitting portion to illuminate and display the light-transmitting portion; and a housing including an opening, the housing accommodating the display light source, the light-transmitting portion being arranged in the opening, wherein the light-transmitting portion includes a transparent plastic base member, a first color exhibiting layer containing dye or pigment, and a second color exhibiting layer containing a filler made of a cold mirror thin film reflecting visible light and transmitting infrared light, the first color exhibiting layer has a transmittance of 20% or more for light having a specific wavelength, and the second color exhibiting layer has a reflectance of 80% or less for light having a wavelength not absorbed by the dye or the pigment of the first color exhibiting layer and a transmittance of 60% or more for light having a wavelength absorbed by the dye or the pigment of the first color exhibiting layer.

2. The display device according to claim 1, wherein a reflecting portion configured to facilitate reflection of light is arranged on a surface of the housing that is opposed to the light-transmitting portion.

3. The display device according to claim 1, wherein the light-transmitting portion has a transmittance of 60% or more for infrared light and an attenuation factor of 3.0 dB or less for millimeter waves.

* * * * *